(12) United States Patent
Gao et al.

(10) Patent No.: US 7,980,074 B2
(45) Date of Patent: *Jul. 19, 2011

(54) ACTIVE MATERIAL ACTUATOR ASSEMBLY

(75) Inventors: Xiujie Gao, Troy, MI (US); Alan L. Browne, Grosse Pointe, MI (US); Nancy L. Johnson, Northville, MI (US); Ukpai I. Ukpai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/501,417

(22) Filed: Aug. 9, 2006

(65) Prior Publication Data
US 2008/0034750 A1   Feb. 14, 2008

(51) Int. Cl.
*F01B 29/10*   (2006.01)
(52) U.S. Cl. .......................................... 60/527; 60/528
(58) Field of Classification Search ............. 60/527–529
See application file for complete search history.

(56) References Cited

U.S. PATENT DOCUMENTS

| | | | | |
|---|---|---|---|---|
| 3,430,441 A * | 3/1969 | Adams | | 60/529 |
| 4,037,411 A * | 7/1977 | Hochstein | | 60/527 |
| 4,087,971 A * | 5/1978 | Hart | | 60/527 |
| 4,306,415 A * | 12/1981 | Hochstein et al. | | 60/527 |
| 4,811,564 A | 3/1989 | Palmer | | |
| 5,068,565 A | 11/1991 | Huang | | |
| 5,306,979 A | 4/1994 | Schwarz, Jr. | | |
| 5,992,815 A | 11/1999 | Metzdorf et al. | | |
| 6,155,220 A | 12/2000 | Marriott | | |
| 6,242,841 B1 * | 6/2001 | Williams | | 310/306 |
| 6,326,707 B1 | 12/2001 | Gummin et al. | | 310/12 |
| 6,574,958 B1 | 6/2003 | MacGregor | | 60/527 |
| 6,762,515 B2 | 7/2004 | Gummin et al. | | 310/12 |
| 6,832,477 B2 | 12/2004 | Gummin et al. | | 60/527 |
| 6,834,835 B1 | 12/2004 | Knowles et al. | | 244/198 |
| 6,928,812 B2 | 8/2005 | Donakowski et al. | | 60/527 |
| 6,979,050 B2 | 12/2005 | Browne et al. | | 296/180.5 |
| 7,021,055 B2 | 4/2006 | Gummin et al. | | 60/527 |
| 7,029,056 B2 | 4/2006 | Browne et al. | | 296/146.9 |
| 7,076,951 B2 * | 7/2006 | Zanella et al. | | 60/527 |
| 7,464,548 B2 | 12/2008 | Yson et al. | | |
| 2002/0046622 A1 | 4/2002 | Yoshida | | |
| 2004/0256920 A1 | 12/2004 | Gummin et al. | | 310/15 |

OTHER PUBLICATIONS

Office Action from the United States Patent and Trademark Office for U.S. Appl. No. 11/501417, mailed Dec. 7, 2009.
Search Report from the International Searching Authority for International Application No. PCT/US07/74381, mailed Sep. 16, 2008.
Written Opinion of the International Searching Authority for International Application No. PCT/US07/74381, mailed Feb. 19, 2009.
Darel E. Hodgson et al., Using Nitinol Alloys, 20000, Shape Memory Applications, Inc., pp. 15-25, 2000.
Nanomuscle Actuator User Guide, Nov. 29, 2001, Nanomuscle, Inc., pp. 15-18.
Funakabo, Shape Memory Alloys, 1987, pp. 218-220, Fig. 3.45.

* cited by examiner

*Primary Examiner* — Hoang M Nguyen
(74) *Attorney, Agent, or Firm* — Quinn Law Group, PLLC

(57) ABSTRACT

Active material actuator assemblies are provided that enable simplified control systems and faster actuator cycle times. A movable member is provided that has multiple active material components operatively connected to it. The active material components are separately selectively activatable for moving the movable member. Movement of the movable member via activation of a first of the active material components triggers activation of the second active material component to further move the movable member. Alternatively or in addition, previously activated active material components are protected from undesired stretching during activation of another active material component or, when desired, an active material component may be reset via activation of another of the active material components in order to prepare it for subsequent activation.

11 Claims, 9 Drawing Sheets

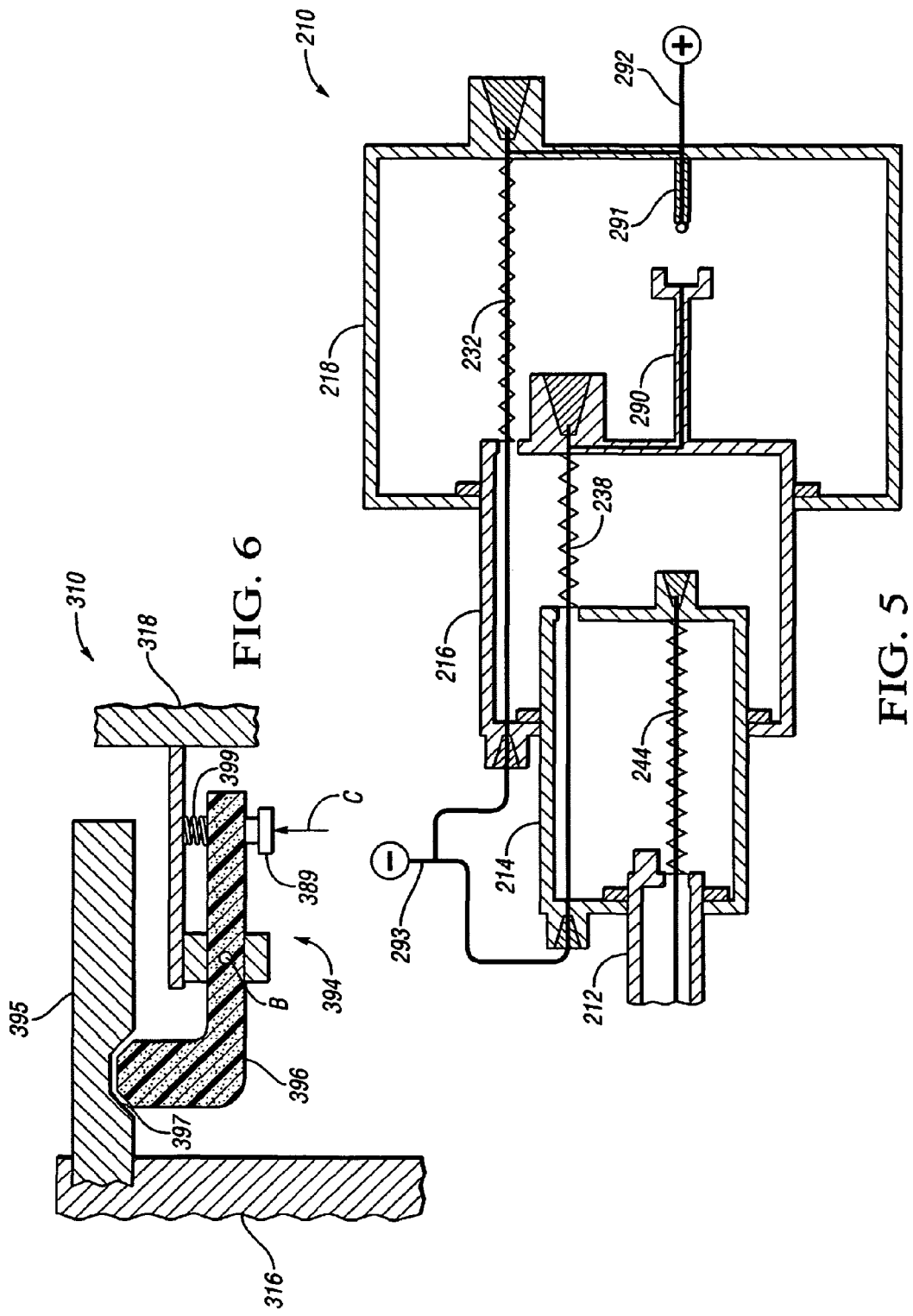

ACTIVE MATERIAL ACTUATOR ASSEMBLY

TECHNICAL FIELD

The invention relates to active material actuator assemblies.

BACKGROUND OF THE INVENTION

Active materials include those compositions that can exhibit a change in stiffness properties, shape and/or dimensions in response to an activation signal, which can be an electrical, magnetic, thermal or a like field depending on the different types of active materials. Preferred active materials include but are not limited to the class of shape memory materials, and combinations thereof. Shape memory materials, a class of active materials, also sometimes referred to as smart materials, refer to materials or compositions that have the ability to remember their original shape, which can subsequently be recalled by applying an external stimulus (i.e., an activation signal). As such, deformation of the shape memory material from the original shape can be a temporary condition.

SUMMARY OF THE INVENTION

Active material actuator assemblies are provided that enable simplified control systems and faster actuation cycle times. In one aspect of the invention, a movable member is provided that has multiple active material components operatively connected to it. The active material components are separately selectively activatable to actuate and thereby move the movable member. Movement of the movable member via activation of a first of the active material components triggers activation of the second active material component to further move the movable member. The activation may be accomplished via activation mechanisms, such as electrical contact strips, that are positioned so that an electrical circuit that activates the second active material component is completed by movement of the movable member in response to the activation of the first active material component. In the case of fluid heating, flow redirecting mechanisms such as spool valves can be arranged so that actuation of the first movable member moves a spool valve to complete another fluid circuit and thereby trigger activation of the second active material component to further move the movable member. Because activation of the second active material component is physically linked to movement of the movable member via the first active material component, control system algorithms to activate the second active material component are not necessary, potentially reducing costs.

In another aspect of the invention, multiple active material components operatively connected to a movable member are each separately selectively activatable in repeating series for sequential actuation for moving the movable member and are configured such that a previously activated one of said active material components is not reset (e.g., stretched) by actuation of a currently activated active material component. Accordingly, the previously activated component is given time to reduce its resistance to resetting (e.g., to cool) before it is reset and reactivated and thus does not provide resistance during actuation of the currently activated component, increasing efficiency of the actuator assembly.

In another aspect of the invention, multiple active material components operatively connected to a movable member are each separately selectively activatable in repeating series for moving the movable member and are configured such that a subsequently activated one of said active material components is at least partially reset by actuation of a currently activated one of said active material components. When it is time for the subsequently activated active material component to be activated, it has been wholly reset by one or more of the previously activated active material components to its preactivation state (e.g., a martensite phase in an SMA) in preparation for activation. This "resetting" is physically accomplished via actuation of at least one active material component and therefore additional control system algorithms to reset the active material components are not necessary, potentially reducing costs. Additionally, because the resetting is mechanically accomplished, resetting may be more exact than one accomplished via a control system relying on feedback with its associated inaccuracies.

The active material actuator assemblies provided herein may function as rotational motors that are more efficient than previous stepping motors that use four shape memory coil springs pulling a biased pin from four different directions to achieve rotation by actuating the SMA springs sequentially. In known stepping motors, only a relatively small force is applied by the springs. Additionally, in such designs after contraction of a spring, it is still relatively hot compared to the ambient temperature and will apply large resistance to the pulling by the next spring compared to the resistance it applies when its temperature is close to ambient (i.e., when in the martensite phase). Finally, there is a waste of the amount of stretch each spring is subjected to since each spring is overstretched by the opposite one and only part of the stretch is used to pull the pin and turn the shaft. The cooperative resistance reduction and resetting mechanism in the rotational motors proposed here can also be used to avoid overstretch such that the full amount of stretch an active material component is subject to is used to do useful work and rotate the shaft.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic, partially cross-sectional illustration in partially fragmentary view of a third embodiment of a telescoping active material actuator assembly having automatic sequential activation;

FIG. 6 is a schematic illustration of an exemplary embodiment of a locking mechanism for use on any of the actuator assemblies of FIGS. 1, 4 and 5;

DESCRIPTION OF THE PREFERRED EMBODIMENTS

Figure 1:
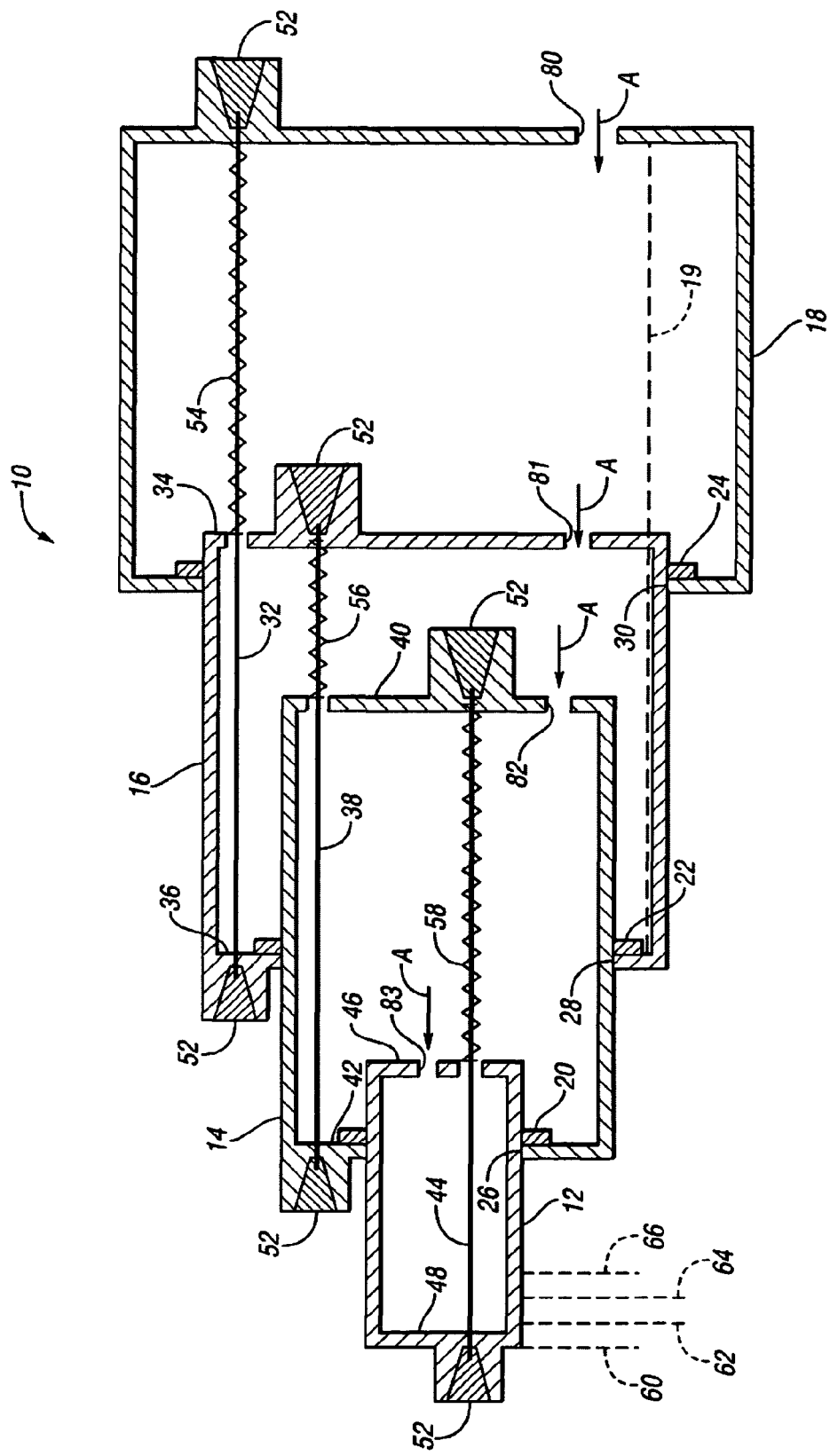
FIG. 1 is a schematic, partially cross-sectional illustration of a first embodiment of a telescoping active material actuator assembly.

A number of exemplary embodiments of active material actuator assemblies within the scope of the invention are described herein. The active material actuator assemblies all utilize active material components that may be, but are not limited to, a class of active materials called shape memory materials. Exemplary shape memory materials include shape memory alloys (SMAs), electroactive polymers (EAPs) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, composites of the foregoing shape memory materials with non-shape memory materials, and combinations comprising at least one of the foregoing shape memory materials. For convenience and by way of example, reference herein will be made to shape memory alloys and shape memory polymers. The shape memory ceramics, baroplastics, and the like can be employed in a similar manner as will be appreciated by those skilled in the art in view of this disclosure. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application of external stimuli has led to their use in actuators to apply force resulting in desired motion. Smart material actuators offer the potential for a reduction in actuator size, weight, volume, cost, noise and an increase in robustness in comparison with traditional electromechanical and hydraulic means of actuation. However, most active materials are capable of providing only limited displacement, limiting their use in applications requiring a large displacement, whether linear or rotational. The invention described herein solves this problem.

SMAs

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is often called the austenite finish temperature ($A_f$). When the shape memory alloy is in the austenite phase and is cooled, it begins to change into the martensite phase, and the temperature at which this phenomenon starts is often referred to as the martensite start temperature ($M_s$). The temperature at which austenite finishes transforming to martensite is often called the martensite finish temperature ($M_f$). The range between $A_s$ and $A_f$ is often referred to as the martensite-to-austenite transformation temperature range while that between $M_s$ and $M_f$ is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below $A_s$). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100 degrees Celsius to below about −100 degrees Celsius. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. As will be described in greater detail below, the material will retain this shape after the stress is removed.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses which can be as high as the inherent yield strength of the austenite material, sometimes up to three or more times that of the deformed martensite phase. For applications that require a large number of operating cycles, a strain in the range of up to 4% or more of the deformed length of wire used can be obtained. In experiments performed with Flexinol® wires of 0.5 mm diameter, the maximum strain in the order of 4% was obtained. This percentage can increase up to 8% for thinner wires or for applications with a low number of cycles. This limit in the obtainable strain places significant constraints in the application of SMA actuators where space is limited.

SMPs

As previously mentioned, other suitable shape memory materials are shape memory polymers (SMPs). "Shape memory polymer" generally refers to a polymeric material, which exhibits a change in a property, such as a shape, a dimension, a shape orientation, or a combination comprising at least one of the foregoing properties in combination with a change in its elastic modulus upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature ($T_g$), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

EAPS

The active material may also comprise an electroactive polymer such as ionic polymer metal composites, conductive polymers, piezoelectric polymeric material and the like. As used herein, the term "piezoelectric" is used to describe a material that mechanically deforms when a voltage potential is applied, or conversely, generates an electrical charge when mechanically deformed Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer is a piezoelectric poly (vinyldene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used for electrodes of the present disclosure may vary. Suitable materials used in an electrode may include graphite, carbon black, colloidal suspension, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

SMCs/Piezoelectric

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for Thin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (metharcylic acid ("PMA"), and their derivatives; polyureas, and their derivatives; polyerethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, T, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof; and Group VIA and IIB compounds, such as CdSe, CdS, GaAs, $AgCaSe_2$, ZnSe, GaP, InP, ZnS and mixtures thereof.

MR Elastomers

Suitable active materials also comprise magnetorheological (MR) compositions, such as MR elastomers, a class of smart materials whose rheological properties can rapidly change upon application of a magnetic filed. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop their structure when exposed to a magnetic field in as little as a few milliseconds. Discontinuing the exposure of the MR elastomers to the magnetic field reverses the process and the elastomer returns to its lower modulus state. Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

MSMAs

MSMAs are alloys, often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

Exemplary Embodiments of Telescoping Active Material Actuator Assemblies

Referring to FIG. 1, a first embodiment of an active material actuator assembly 10 is illustrated. The active material actuator assembly 10 has multiple movable members 12, 14 and 16 and a fixed anchor member 18. Movable member 14 is referred to in the claims as the first movable member and movable member 16 is referred to as the second movable member. The movable members 12, 14 and 16 are preferably concentric bodies, which in cross-section may be circular, rectangular, triangular or any other shape, and are arranged in a "telescoping manner" such that movable member 12 is able to move at least partially in and out of movable member 14, which can move at least partially in and out of movable member 16, which can move at least partially in and out of anchor member 18. In alternative embodiments, the movable members 12, 14 and 16 need not be concentric. The telescoping movable members may be aligned to provide linear movement or may have a curved form to cause nonlinear movement, such as along a circumference of a circle. Multiple active material components are utilized to affect the telescoping movement. An active material component 32 is connected at one end to anchor member 18 and at an opposing end to movable member 16. Active material component 32 is referred to as the first active material component in the claims. The active material component 32 is shown routed through an opening in a proximal face 34 of movable member 16 and connected to a distal face 36 of the movable member 16, but could alternatively be connected to the proximal face 34. Active material component 38 is connected at one end to movable member 16 and at an opposing end to movable member 14. Active material component 38 is referred to as the second active material component in the claims. The active material component 38 is shown routed through an opening in a proximal face 40 of movable member 14 and connected to a distal face 42 of the movable member 14, but could alternatively be connected to the proximal face 40. Active material component 44 is connected at one end to movable member 14 and at an opposing end to movable member 12. The active material component 44 is shown routed through an opening in a proximal face 46 of movable member 12 and connected to a distal face 48 of the movable member 12 but may alternatively be connected to the proximal face 46. End anchors 52 secure the respective ends of the active material components 32, 38 and 44 to the respective movable members and the anchor member. The anchors 52 may be crimped portions of the respective active material components or may be any material capable of restraining an end of the active material component to the respective member, such as a rubber plug, a welded joint or adhesive/epoxy bonded joint.

In FIG. 1, three active material components 32, 38 and 44 are shown. Within the scope of the invention, additional movable members connected with additional active material components may be used. Although the active material components 32, 38 and 44 are depicted as elongated wires, they may be rods, blocks, springs or any other shape capable of contracting upon activation (or deactivation). Finally, an active material component may consist of multiple discrete active material elements such that multiple active material elements may be connected between a pair of adjacent movable members or between the anchor member 18 and movable member 16; i.e., sets of active material components may be used. For example, an additional active material component 19 (shown in phantom) may be connected between the anchor member 18 and the movable member 16 in addition to the single active material component 32. The active material elements may be in the form of wires or any other geometric shape.

It should be appreciated that, within the scope of the invention, a single active material component such as an SMA wire may be configured with different regions or segments connecting a movable member to a fixed member having different active material properties such that modulated movement of a load attached to the movable member is achieved between the movable member and the fixed member via the different regions of the single active material component actuating at different times.

In FIG. 1, the movable members 12, 14 and 16 are shown at extreme extended positions, each not able to move any further out of the respective adjacent member due to flange-like stops 20, 22, 24 that extend from the respective movable members 12, 14 and 16, to interfere with an inner surface of the respective adjacent members at openings 26, 28, 30 in movable members 14, 16 and anchor member 18 through which the movable members 12, 14 and 16 translate, respectively. The stops 20, 22 and 24 are integrally arranged such that movement of movable member 16 to the right via contraction of active material component 32 pulls along movable members 12 and 14, and movement of movable member 14 to the right via contraction of active material component 38 pulls along movable member 12.

The active material components 32, 38 and 44 are shown in the stretched, extended state prior to activation. In the embodiment of FIG. 1, the active material components 32, 38 and 44 are SMAs actuated at different respective temperatures which may be achieved by the temperature of the surrounding fluid or by resistive heating serving as an activation signal or trigger. The active material component 32 has the lowest Austenite start temperature, (As) followed by active material component 38 and then active material component 44 (i.e., the active material components are arranged in ascending order of Austenite start temperature (As) from the right). The transformation temperature ranges for each of the active material components 32, 38 and 44 may be completely distinct or may overlap. The temperature of the active material components 32, 38 and 44 could be increased by radiative heating, resistive heating (see FIG. 5), fluidic (convective) heating (shown as an option in FIG. 1) or any combination of the above.

Return Mechanism

FIG. 1 contains three respective biasing springs 54, 56 and 58 acting as return mechanisms urging movable members 16, 14 and 12, respectively, to the left (against return to original shape). The biasing springs 54, 56 and 58 are optional because certain SMA materials with the reversible shape memory effect have the ability to return completely to their original shape without the application of an external restoring force. Also, a restoring force (bias) could be introduced into a load attached to the movable member 12 (or included in movable member 12). Furthermore, within the scope of the invention, a design with only one biasing spring 54 could be used. Any other arrangement that puts biasing springs in opposition to the recovery force (i.e., the contraction force) of the active material components could be used, such as arranging the biasing spring external to the movable members 32, 38 and 44 or using one biasing spring with the load for all of the active material components. Additionally, the stops 20, 22 and 24 act as overstretch prevention mechanisms as they prevent stretching of the active material components, (due to the return force of the springs 54, 56 and 58, respectively) beyond the length determined by interference of the stops 20, 22 and 24 with respective movable members 14, 16 and anchor member 18.

For purposes of illustration, in the embodiment of FIG. 1, it is assumed that activation is passively triggered by radiant heating and that the active material components 32, 38 and 44 are exposed to the same surrounding temperature. As the temperature of the active material components 32, 38 and 44 increases, the transformation of active material component 32 occurs first. Consequently, movable member 16 is pulled to the right and with it, due to the stops 20 and 22, movable members 12 and 14, and therefore the load, all working against the force of biasing spring 54 (if used).

Modulated Movement

Figure 2:
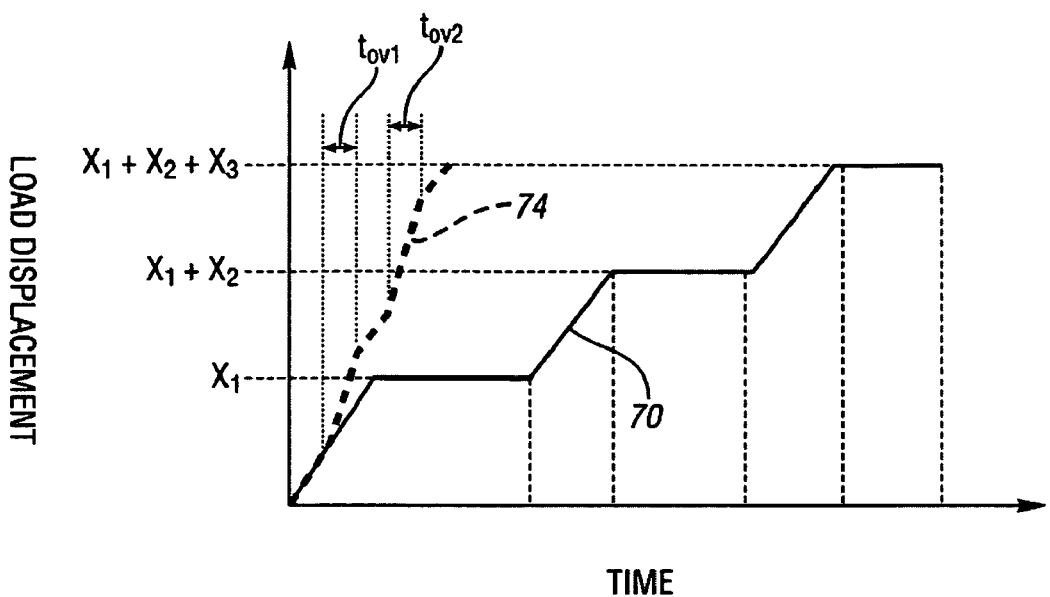
FIG. 2 is a graph of load displacement versus time for the active material actuator assembly of FIG. 1.
Figure 3:
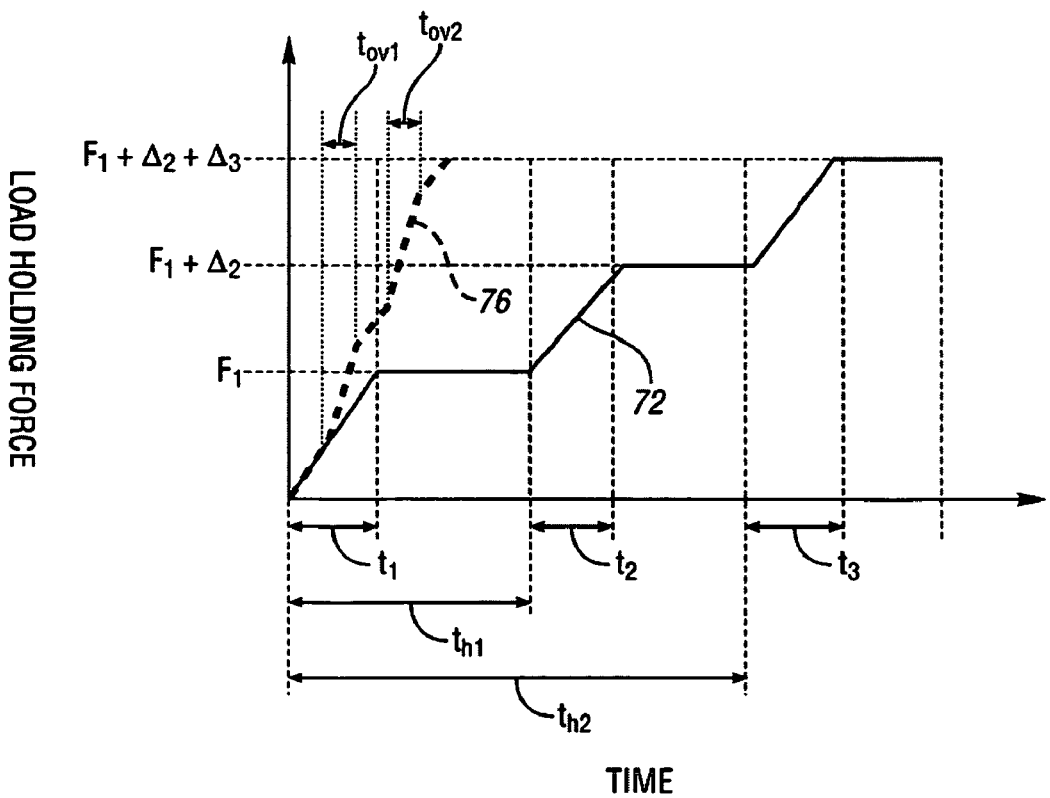
FIG. 3 is a graph of load holding force versus time for the active material actuator assembly of FIG. 1.

The total displacement achieved and force acting on the load attached to movable member 12, due to the recovery force of the active material component 32, is illustrated by $x_1$ and $F_1$ in FIGS. 2 and 3 respectively. The displacement $x_1$ is indicated in FIG. 1 as movement of movable member 12 from a start position 60 to an intermediate position 62. At the completion of the transformation of active material component 32 (or while transformation of active material component 32 is in progress if the transition temperature ranges of active material components 38 and 32 overlap. This is illustrated by the dashed line in FIGS. 2 and 3 with the overlap region between active material component 32 and active material component 38 represented by the interval $t_{ov1}$. Active material component 38 begins to transform pulling with it movable members 12 and 14, and therefore the load. This causes an additional displacement of the load of $x_2$ and the force acting on the load is increased by $\Delta_2$, illustrated in FIGS. 2 and 3. The displacement caused by activation of active material component 38 is indicated in FIG. 1 by movement of movable member 12 from intermediate position 62 to intermediate position 64. Similarly as with the transformation of active material component 32, at the completion of the transformation of active material component 38 (or while the transformation of active material component 38 is in progress if the transition temperature ranges overlap as illustrated in FIGS. 2 and 3 with the overlap region between active material component 38 and active material component 44 represented by the interval $t_{ov2}$), active material component 44 begins to transform, thereby pulling with it movable member 12 and working against the opposing force of spring 58. At the completion of the transformation of active material component 44, there is an additional displacement of the load of $x_3$ and the force on the load is increased by $\Delta_3$, illustrated in FIGS. 2 and 3. The displacement caused by activation of active material component 44 is indicated in FIG. 1 by movement of movable member 12 from intermediate position 64 to intermediate position 66 in FIG. 1.

In FIGS. 2 and 3, the increments in load displacement ($x_1$, $x_2$ and $x_3$) and in force (F1, $\Delta_2$ and $\Delta_3$) appear equal for purposes of illustration only, but could be different depending on the characteristics of the active material components 32, 38 and 44 and the biasing springs 54, 56 and 58 and the kind of load that is attached to the movable member 12. For example, it may be desirable to select the active material components such that some actuate quickly and achieve a relatively large displacement, followed by later actuation of another active material component to achieve a relatively small displacement. For example, active material components 32 and 38 may actuate at lower temperatures and may be selected to contract a relatively large amount, followed by actuation of active material component 44 which may actuate at a relatively high temperature and contracts a lesser amount. The actuation of the earlier actuated active material components may also occur more quickly than the actuation of the later actuated active material component to achieve a fast initial displacement followed by a slower movement to the final load position. In this way, the earlier actuated active material components accomplish coarse tuning or positioning of the load, while the later actuation fine-tunes the load position. Such an arrangement may simplify a control system designed to control the fixed position of the load. If all but one of the active material components actuate simultaneously to accomplish the coarse turning and the fixed active material component accomplishes fine tuning, the control system need only monitor the position of the load after the coarse tuning (i.e., monitor a single measurement of the initial, relatively large coarse-tuned displacement) to provide feedback for accurate positioning during fine tuning, rather than monitoring a series of displacements by actuation of active material components at different times that achieve the coarse tuning. This avoids the cumulative error associated with a series of discrete control measurements and also simplifies any overall control design. It is to be further appreciated that a load that linearly increases with displacement is assumed in the illustrations of FIGS. 2 and 3.

The distinct or overlapping transformations of the different active material components 32, 38 and 44 give rise to a modulated displacement profile of the load connected to movable member 12. The result is that a larger displacement is obtained than with a single active material component or than with multiple active material components spanning from the distal face 48 of movable member 12 to the portion of anchor member 18 at which active material component 32 is connected. Furthermore, the recovery force is modulated as shown in the illustration of FIG. 3. The stress on the active material components 32, 38 and 44 continually varies with the actuation of each subsequent active material component (assuming no optional locking/latching mechanisms, as in the description below). It is preferable to ensure that the maximum stress in each active material component does not exceed the value required for acceptable performance. If the surrounding temperature decreases, the active material components 32, 38 and 44 will be restored to their martensite phase lengths (i.e., the movable members will return to the positions shown in FIG. 1) due to the load and the biasing force of the respective springs 54, 56 and 58 (if used), in order as temperature decreases.

Preferably the recovery force of active material component 44 is larger than that of active material component 38 which in turn is larger than that of active material component 32. This is especially useful if locking mechanisms are used after the actuation of each active material component thereby isolating the active material component and allowing the next active material component to have a larger recovery force.

In FIGS. 2 and 3, curves 70 and 72, shown with solid lines, represent the load displacement profile and the load holding force profile, respectively, for the case where transformation of each active material component is completed before the subsequent one begins. Transformation of active material component 32 begins at time t=0, and is completed at time $t=t_1$. There is a hold period until time $t=t_{h1}$ when the temperature of the active material component 38 reaches its austenite start temperature, at which point transformation of active material component 38 begins and continues until time $t=t_{h1}+t_2$. Again, there is then a hold period until time $t=t_{h2}$ when active material component 44 reaches its austenite start temperature, at which point transformation of active material component 44 begins and is completed at time $t=t_{h2}+t_{h3}$. The flat sections of curves 70 and 72 describe the hold periods where no transformation is taking place.

For an embodiment where the compositions of the active material components 32, 38 and 44 are such that the transformations overlap, the typical load displacement profile and load holding force profile are illustrated by curves 74 and 76, respectively. For instance, in FIG. 2, the overlap in the transformation of active material component 32 and active material component 38 occurs over time $t_{ov1}$. During this time, the rate of transformation of active material component 32 increases as active material component 38 begins to transform. At full transformation of active material component 32 the rate of transformation of active material component 38 continues as described earlier. A similar effect occurs over time $t_{ov2}$ for the overlap of active material component 38 and active material component 44. The description above is for illustrative purposes only and the response profile of each active material component, distinctly or during overlap, would generally depend on the composition of the active material component and the heat transfer process between the activation input trigger, whether an actuating field, fluid or current, and the active material component. For instance, the transformation rates shown as constant would generally be nonlinear.

Referring again to FIG. 1, if active convective (fluid) heating were used instead of passive radiant heating, openings 80, 81, 82 and 83 would be provided in the respective anchor member 18, and in movable members 14, 16 and 12. Arrows A illustrate the direction of fluid flow through the openings 80, 81, 82 and 83 for the general case where the same fluid flows past the different active material components 32, 38 and 44 at the same time. Alternatively, if resistive electrical heating is used, the right end of each active material component could be connected to an electric lead, e.g., a positive electric lead, and the left end would be connected to the opposite electric lead, e.g., a negative electric lead, (i.e., at the anchors 52) with suitable insulation. Current could be supplied to the different active material components 32, 38 and 44 in series or parallel, at the same time or in a defined sequence, depending on the desired force/displacement profile.

Figure 4:
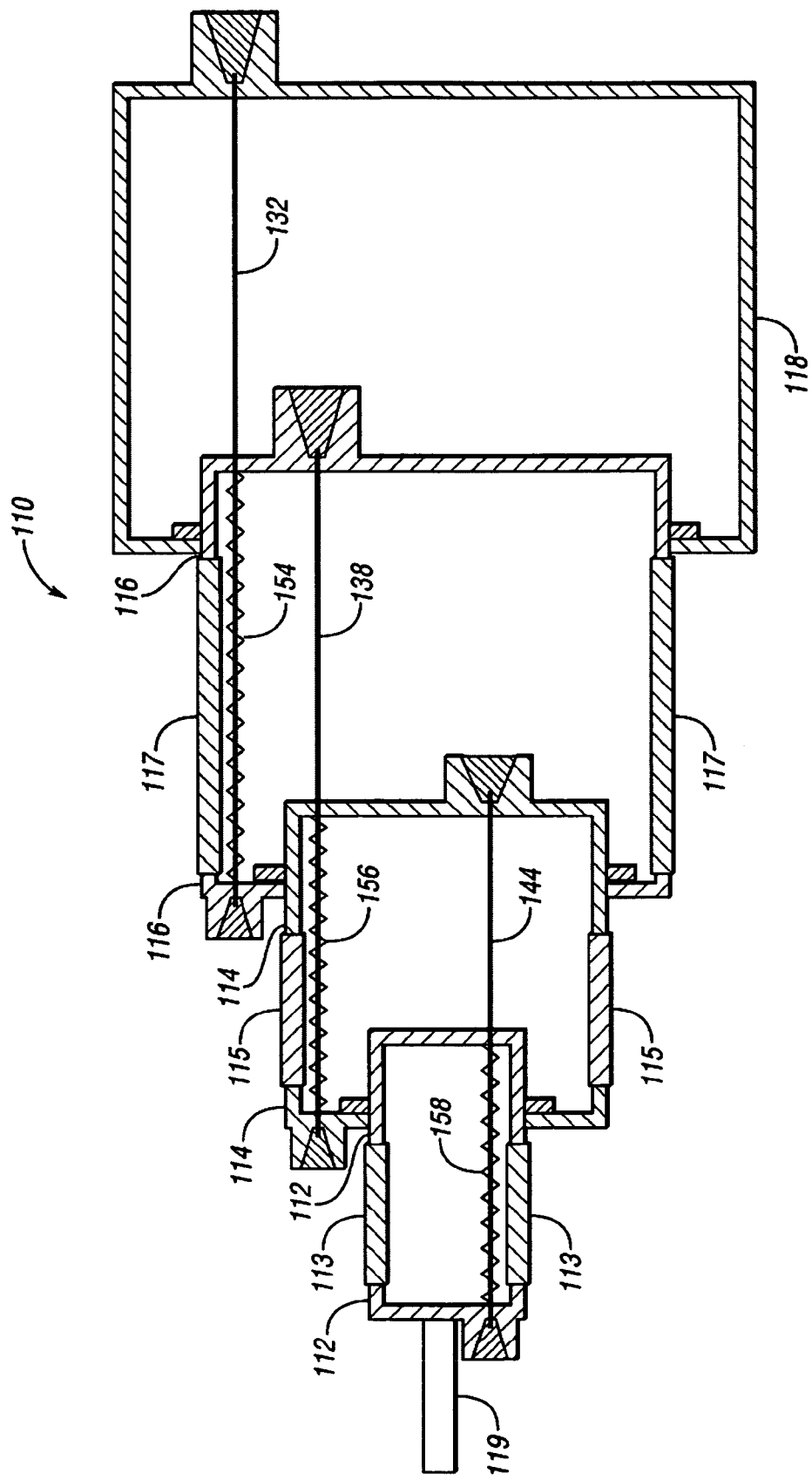
FIG. 4 is a schematic, partially cross-sectional illustration of a second embodiment of a telescoping active material actuator assembly with movable members having bellows.

Referring to FIG. 4, another embodiment of an active material actuator assembly 110 is illustrated. The active material actuator assembly 110 includes movable members 112, 114, and 116, anchor member 118 and active material component 132, 138 and 144 operable in like manner as similarly numbered components in FIG. 1. A load 119 is connected to movable member 112 such that it is moved therewith. Each of the movable members 112, 114 and 116 form a frame around an intermediate resilient portion which in this embodiment is bellows 113, 115 and 117, respectively. The bellows 113, 115 and 117 are made of a suitable material, such as hydroformed metal, and are attached by any suitable means to the movable members 112, 114 and 116, respectively. The bellows are a flexible material that compresses in width as the active material components 132, 138 and 144 contract and the movable members 112, 114 and 116 move to the right. Biasing springs 154, 156 and 158 may be placed in compression within respective movable members 116, 114 and 112 to oppose the restoring force of the active material components 132, 138 and 144. The biasing springs could alternatively be placed in a similar position as springs 54, 56 and 58 in FIG. 1. As an alternative to the biasing springs 154, 156 and 158, the required bias could be built into all of the bellows 113, 115 and 117 or only into bellows 117 to function as a return mechanism resisting the first-activated active material component 132. Alternatively, the active material components used could have reversible shape memory effect in lieu of the biasing springs or bellows.

Automatic Activation

Automatic activation mechanisms could be integrated with the invention so that, assuming active activation, the activation input (i.e., actuating field, fluid or current), is transferred to a succeeding active material component when the preceding active material component reaches a predetermined level of change in a property such as a predetermined level of strain (e.g., a percentage of the maximum possible strain, for safety and/or durability), or when transformation is complete in order to maximize the output of the actuator assembly. That is, movement of a first moveable member via an activation input to a first active material component causes an activation input to a second active actuation mechanism to activate a second active material component. As illustrated in FIG. 5, an active material actuator assembly 210 with movable members 212, 214, 216 and anchor member 218 includes an extension 290 on movable member 216 configured to contact extension 291 on anchor member 218. (Movable member 212 is shown fragmented, but connects to a load similarly to movable member 112 of FIG. 4.) At the completion (or at a predetermined level) of the transformation of active material component 232, the extension 290 fits into and contacts extension 291. This action allows the electric circuit (between positive electric lead 292 and negative electric leads 293) for active material component 238 to be completed, thereby allowing current to flow through the active material component 238 to cause its transformation to the austenite phase. Various ways could be used to ensure that the electric supply is well insulated from the rest of the active material actuator assembly 210, for instance, by using a male/female connection system on the extensions 290 and 291. In other alternative embodiments, the contact between the extension 290 and extension 291 need not directly complete the actuating electric circuit but can be used to trigger the sending of a signal to a control system (not shown) to supply current for the activation of active material component 238 in the case where this is desired. Similar extensions could be added between movable members 214 and 216, to cause automatic activation of active material component 244. In the case of active activation via convective heating, the contacting extensions could each have a hollowed conduit to allow the transfer of heating fluid through the conduits to heat a subsequent active material component when the extensions contact one another. For example, one end of one extension could cause a valve or orifice on the second extension to open, thereby allowing fluid flow which can be routed over the active material component.

Locking Mechanism and Releasing Mechanism

A locking mechanism or mechanisms could be integrated in an active material actuator assembly to lock adjacent movable members to one another to thereby achieve holding of the movable members in an actuated position during a power-off condition. In FIG. 6, an active material actuator assembly 310 (shown only in part, but similar to any of the active material actuator assemblies of FIG. 1, 4 or 5), optional locking mechanism 394 connects movable member 316 to anchor member 318 at the completion of the transformation or at the required level of transformation (i.e., actuation) of an active material component (not shown) connected between movable member 316 and anchor member 318, where these features operate as like numbered components in the active actuator assembly 210, i.e., of FIG. 1, 4 or 5. Similar mechanisms could be used between other pairs of adjacent movable members in the actuator assembly 310. More flexibility is obtained in the level of load holding force obtained at each phase (i.e., at the time period associated with contraction of each active material component) since the total force at each stage could be more than the specified limiting force of the active material component in the preceding stage, as the previously activated active material component is isolated by the locking mechanism. For example, the load holding force could be greater than the specified limiting force of the active material component that connects movable member 316 to anchor member 318 after locking of the locking mechanism 394 as the load is then borne by the locking mechanism 394. Any suitable locking mechanism could be used, including those described with respect to other active actuator assembly embodiments herein. For instance, in the assembly 310 shown in FIG. 6, the arm 395 is attached to the movable member 316 and the extension 396 is attached to the anchor member 318. As the transformation to the fully austenite phase of an active material component connected between movable member 316 and anchor member 318 progresses, movable member 316 is free to translate. Locking occurs when the arm 396 fits into the notch 397 in arm 395 as shown. During the movement to the left of movable member 316 (in the forward transformation to the martensite phase), the locking mechanism 394 is releasable via an upward force (indicated by arrow C) applied to downward extension 389 on extension 396, compressing spring 399 and thereby pivoting arm 396 about pivot point B to allow its release from the notch 397.

Exemplary Embodiment of an Alternative Active Material Actuator Assembly

Figure 7:
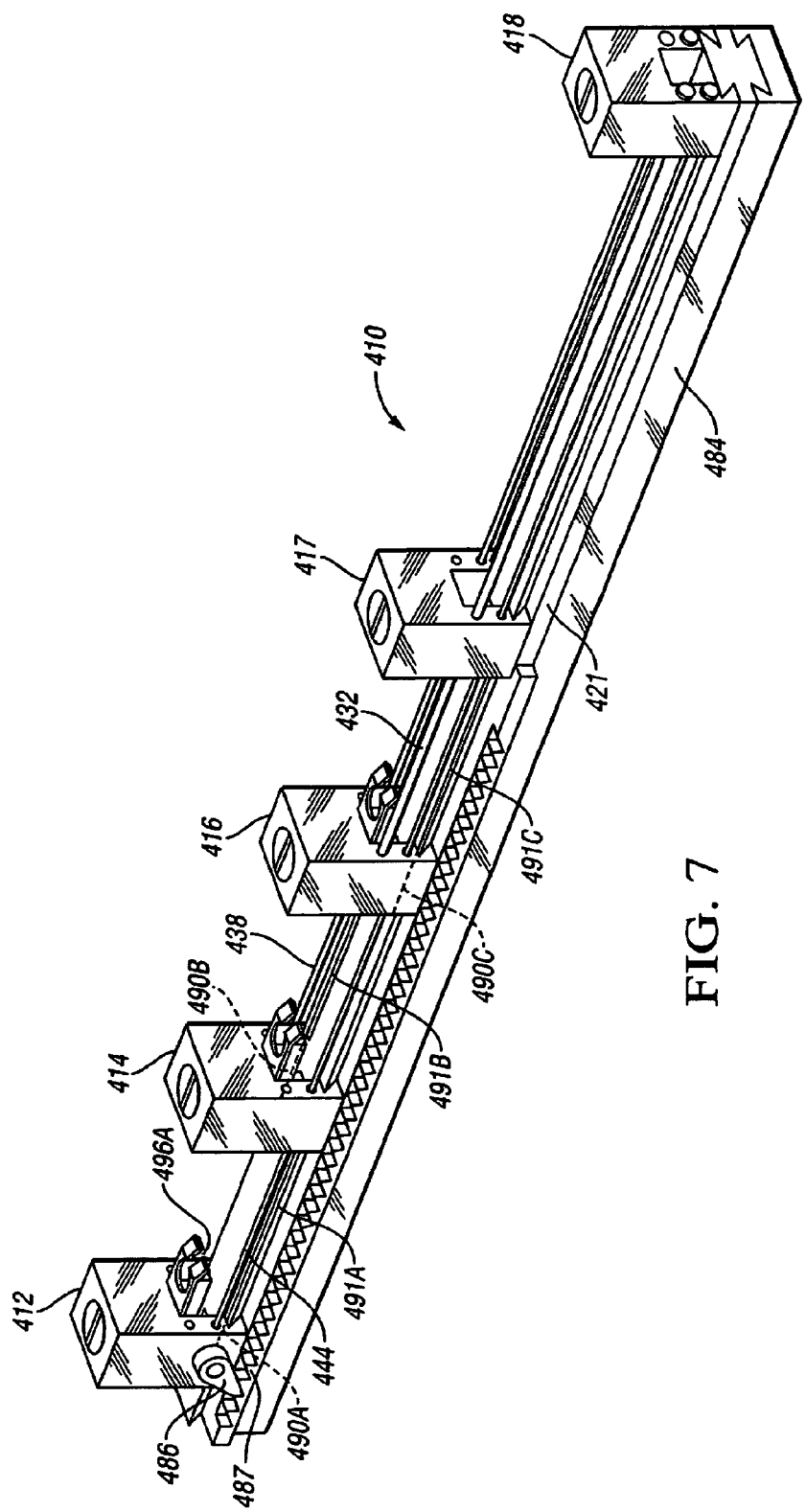
FIG. 7 is a schematic perspective illustration of a fourth embodiment of an active material actuator assembly.

Referring to FIG. 7, another active material actuator assembly 410 utilizes a "train carts on a railroad" approach to achieve large linear displacement. The active material actuator assembly 410 includes movable members 412, 414 and 416, a fixed member 417 and an anchor member 418, all of which are linearly aligned on a base member 421. The movable members 412, 414 and 416 slide or roll with respect to the base member 421, similar to train cars on a railroad track. Although only three movable members are included in the actuator assembly 410 of FIGS. 7-9, it should be understood that only two movable members or more than three may alternatively be used. The fixed member 417 and the anchor member 418 are secured to and do not move with respect to the base member 421. The interface between the movable members 412, 414, 416 and the base member 421 could be any shape and configuration. In cross section, the base member 421 could be circular, oval, rectangular, triangular, square, etc., as long as the movable members 412, 414 and 416 are configured with a mating shape to partially surround the base member. The interface can also be in a dove-tailed shape as shown in FIG. 7. As an alternative approach, the base member 421 could have multiple slots, one for each movable member. It is therefore very easy to prevent overstretching and release each movable member at the appropriate location, as the distal end of a slot will always be the desired location for release of a movable member.

With regard to FIG. 7, the movable members 412, 414 and 416 are connected to the anchor member 418 via respective active material components 444, 438 and 432, respectively. The movable members 414 and 416 and the fixed member 417 have a set of aligned openings therethrough that allow active material component 444 to pass through to connect at a distal end to the movable member 412 and at a proximal end to the anchor member 418, as illustrated. Movable member 416 and fixed member 417 have another set of aligned openings that allow active material component 438 to pass through to connect at a distal end to movable member 414 and at a proximal end to anchor member 418. Finally, fixed member 417 has yet another opening therethrough that allows active material component 432 to pass through to connect at a distal end to movable member 416 and at a proximal end to anchor member 418. The ends of each active material component 432, 438 and 444 are crimped (or attached by any other suitable means such as welding or adhesive bonding) to maintain positioning. In an alternative design, the active material components 432, 438 and 444 connect a respective extension (e.g., a rod or bar) extending from the respective movable member to an extension (e.g. a rod or bar) extending from the anchor member 418 rather than passing through openings in the movable members and the fixed member. To avoid bending and to increase fatigue life, the crimped ends of the active material components 432, 438, and 444 at the anchor member 418 are able to slide rightward during actuation. It is preferred that the bending momentum on the actuator assembly 410 induced by the active material components 432, 438 and 444 is minimized by design choice of active material composition, cross-sectional area of the active material components and the structural strength of the base member 421, the movable members 412, 414, 416, fixed member 417 and anchor member 418. The active material components 432, 438 and 444 are shown in extreme extended positions, in a martensite phase, in which the movable members 412, 414 and 416 will not move further to the left. The movable members 412, 414 and 416 can either roll (via wheel(s) attached to respective movable member with or without bearings), slide or slide and roll on the base member 421 and are separated from each other by predetermined distances according to design. Optionally, multiple anchor members may be utilized so that the proximal ends of the active material components 432, 438 and 444 can be at different longitudinal locations with respect to the base member 421. A load or force that is to be moved by the active material actuator assembly 410 is either formed by the movable member 412 or is mechanically linked to a distal side of it. The load or force may be a weight or spring configured to act as a return mechanism (i.e., to create a force biased against contraction of the active material components 412, 414 and 416).

When active material component 444 is activated (by supplying electrical current, as will be discussed below), the recovery or contraction force of the active material component 444 is greater than the total resistance of the load, and the movable member 412 is pulled to the right toward movable member 414. When movable member 412 moves close to movable member 414, they lock together via a locking mechanism such as that described in detail with respect to FIG. 8. Next active material component 438 is activated to bring movable members 412 and 414 (locked together) to movable member 416. When movable member 414 is close to movable member 416, they lock together by locking mechanism such as that described with respect to FIG. 8. Similarly, when active material component 432 is then activated, locked-together movable members 412, 414 and 416 move to the right and movable member 416 is locked to the fixed member 417 by a locking mechanism as described with respect to FIG. 8.

Locking Mechanism, Releasing Mechanism and Overstretch Prevention Mechanism

Figure 8:
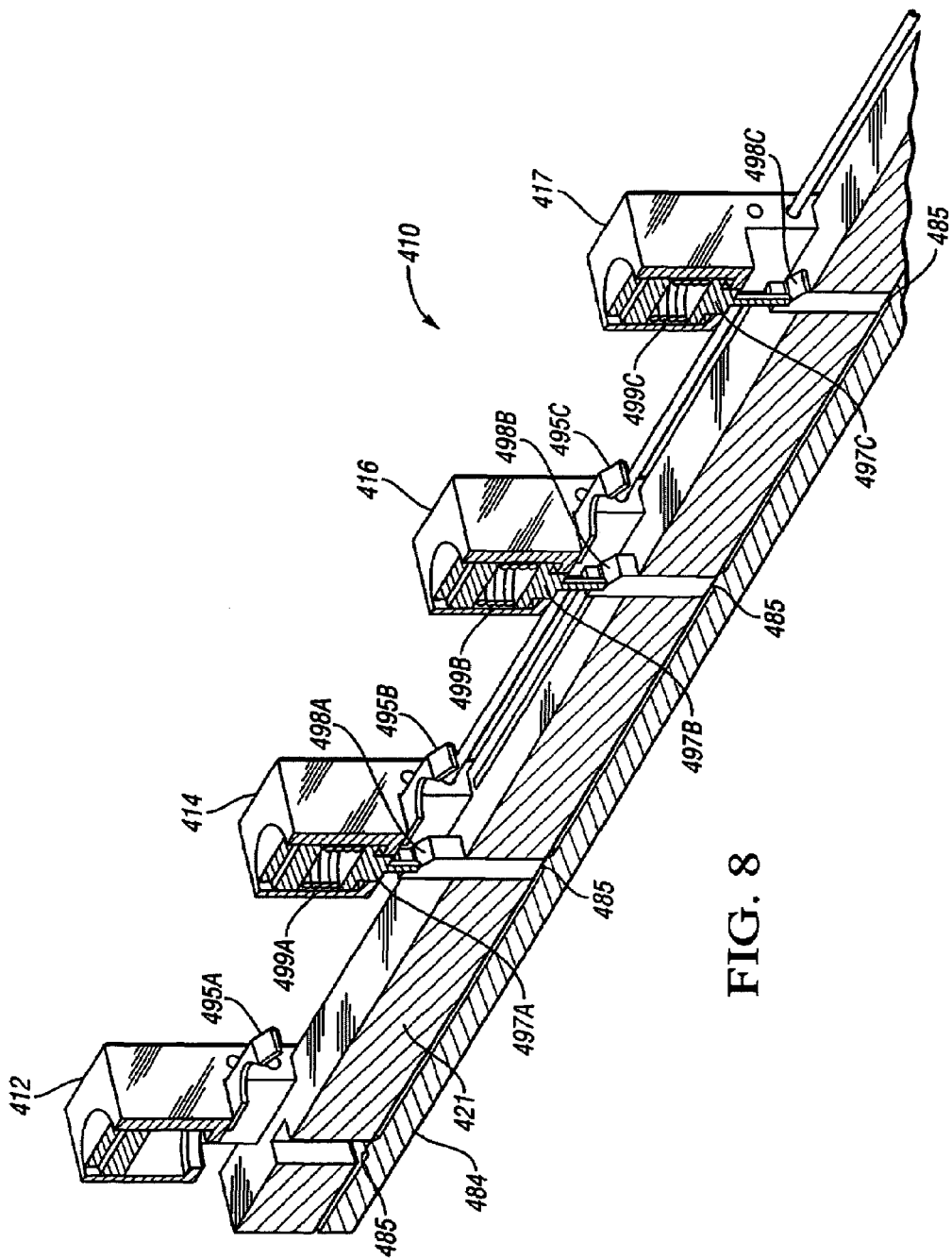
FIG. 8 is a schematic perspective illustration in cross-sectional view of the actuator assembly of FIG. 7.

With reference to FIGS. 7 and 8, each movable member 412, 414, 416 includes a locking mechanism. Locking mechanism for movable member 412 includes latch 495A, pin 497A and spring 499A. Latch 495A is able to enter a slot formed in movable member 414 and go further with pin 497A passing through due to a slotted keyhole 496A (see FIG. 7) in the front with a width slightly wider than the diameter of a pin 497A retained in an opening within the movable member 414. When movable member 412 touches movable member 414, the keyhole 496A in latch 495A is exactly under the pinhead (i.e., a double-flanged head) of pin 497A. With a little more shrinking of the active material component 444 (see FIG. 7), the latching pin 497A will move downward due to the slope of ramped key 498A and the biasing force of spring 499A, to fall within the keyhole in latch 495A. The uppermost flange on the pin 497A is larger than the bottom hole of movable member 414 and thus rests above it to ensure that the pin 497A rests in the latch 495A to latch movable members 412 and 414 together. Movable member 414 (with movable member 412 latched to it) is locked to movable member 416 in like fashion as active material component 438 contracts, and movable member 416 (with movable members 412 and 414 locked to it) is locked to fixed member 417 in like fashion.

The releasing of the latches is in exactly the reverse order and will be described with respect to the release of movable member 412 from movable member 414. When movable members 412 and 414 are pulled leftward in FIGS. 7 and 8 together by the load after actuation when conditions allow active material component 444 to return to its martensite phase, latching pin 497A touches the slope in the key 498A, rides up the slope, and the pin 497A is moved upward until it slides into an upwardly extending stopper portion of the ramped key 498A. The stopper portion acts as an overstretch prevention mechanism, preventing further movement to the left. At this point, the bottom of the lower flange of the double-flanged head of the pin 497A (see FIG. 9 for a view of the double-flanged head) is flush with the top of the latch 495A and therefore releases it. Similar latches, latching pins and ramped keys are utilized between movable members 414 and 416 and between movable member 416 and fixed member 417.

The release of a movable member by releasing the latch must be done when the movable member is at the pre-contraction (original stressed) position. Otherwise, the active material component attached to the movable member may not be stretched enough for next activation and a more distal movable member (activated just prior) will not be able to lock to it. Therefore, the keys 498A-498C are positioned in base member 421 at the desired start position of the movable members 412, 414 and 416 or the position of fixed member 417.

Figure 9:
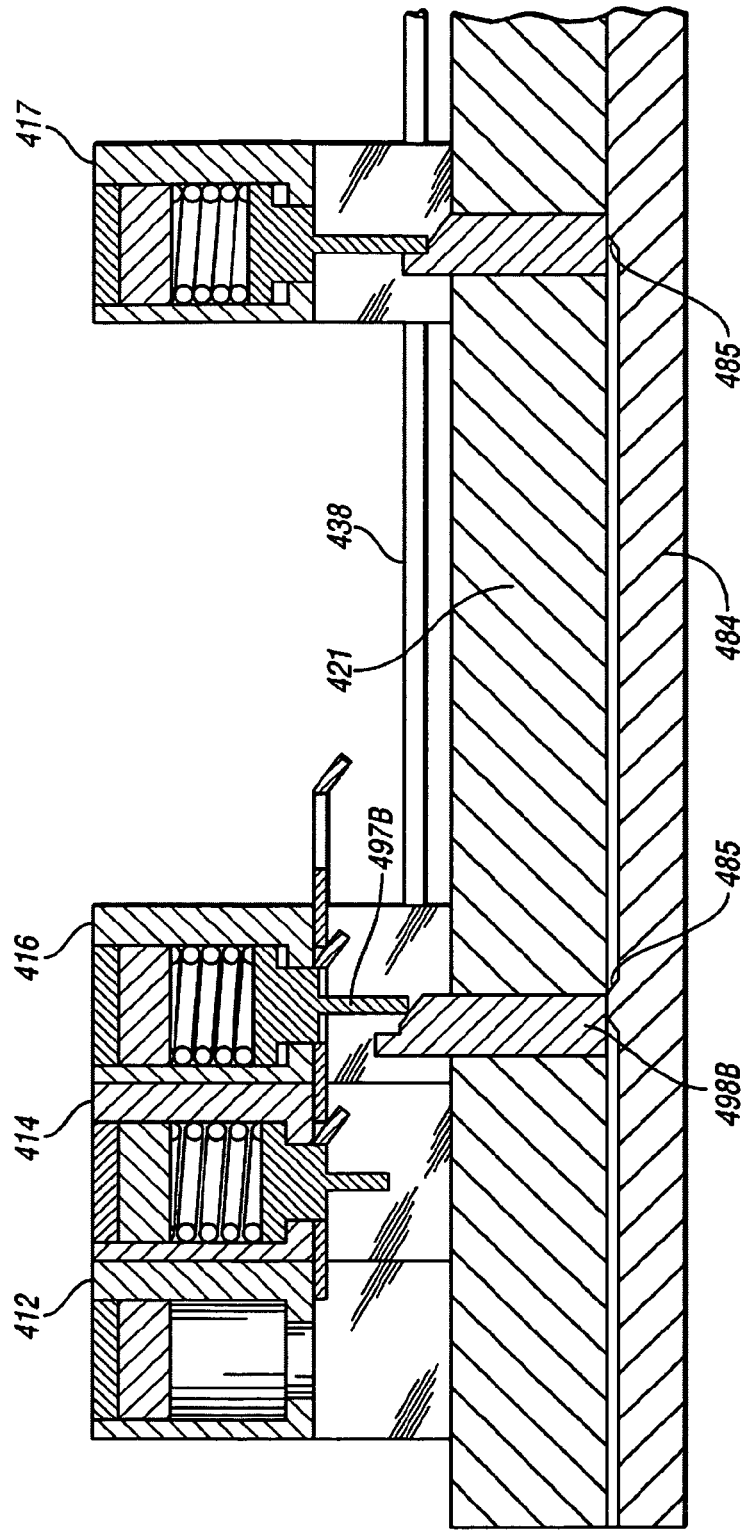
FIG. 9 is a schematic fragmentary, cross-sectional view of the actuator assembly of FIGS. 7 and 8 with some of the active material components activated and the movable members locked together.

Since the latching pins 497A and 497B move together with the respective movable members 414 and 416, they should not be blocked by keys 498B and 498C, respectively, when moving in the proximal direction. For example, in the fully locked position, the bottom of pin 497A should be slightly higher than that the top of key 498B. FIG. 9 illustrates that the shank portion of the pins 497A, 497B, and 497C have respectively longer lengths and the keys 498A, 498B and 498C are in order of descending height (key 498A not shown in FIG. 9) so that the more distal movable member, will pass over the more proximal keys during return to the pre-contraction position. The sum length of each locking pin 497A-497C and its matching ramped key 498A-498C is the same for movable members 414 and 416 and fixed member 417. Alternatively, to reduce the overall height in comparison with actuator assembly 410, movable members with different widths can be used with keys offset along a horizontal transverse direction such that the keys can be of same height.

Although only one locking mechanism is shown here, any other existing mechanisms or new mechanisms can be adapted for use with any of the active material actuator assemblies described herein, such as a solenoid-based locking mechanism, a smart materials-based locking mechanism, a safety belt buckle-type latch design, or a toggle on-off design such as in a child-proof lock/release for doors or drawers or in a ball point pen. For example, the cart may have a keyhole, such as a T-shaped slot on a surface facing an adjacent cart. The adjacent cart may have a latch designed to fit in the upper portion of the T-shaped slot (i.e., the horizontal portion of the T-shape) and slide into the lower portion (i.e., the vertical portion of the T-shape) when the cart with the latch moves along a ramped track toward the cart with the T-shaped slot to lock the two carts to one another. The slope of the ramped track is designed to cause the relative vertical displacement between the two carts that enables latching and releasing of the latch from the T-shaped slot.

Other examples of locking and release mechanisms include a locking mechanism having a latch on one movable member that is configured to slide into a slot of an adjacent movable member. A separate release member can be actuated to push the latch out of the slot, thus releasing the two movable members from one another. The release member may be a roller attached to the end of a spring. The latch rolls along the roller when released, thus avoiding direct contact with the adjacent movable member during its release and reducing friction associated with the release movement.

Holding Mechanism

Power off holding is desirable for either full displacement (when the most proximal movable member 416 is locked to the fixed movable member 417) or at discrete displacement when a movable member is locked to the next movable member. Power off holding means utilizing a holding mechanism to hold a movable member at a post-activation contracted position, when the activation input is ceased (e.g., when the power is off if resistive heating is used or if temperature cools below the Austenite start temperature in the case of convective or radiant heating). For the embodiment shown in FIG. 8, the key 497A can be lowered down to lock movable members 412 and 414 together. By moving a sliding block 484 underneath the base member 421 along the longitudinal direction, the keys 498A-498C will move off of raised bumps 485 on block 484 and be lowered down due to spring force exerted by springs 499A-499C. With the keys 498A-498C in a lowered position, even though the locking pin 497A of movable member 414 slides on the slope of key 497A during return of the active material component 438 to the martensite phase, key 497A will not be able to push the locking pin 497A far enough up in order for the lower surface of the lower flange of the pinhead to clear the keyhole opening in latch 495A. Moving the sliding block 484 will cause holding of the movable members at the key associated with the most proximal of the movable members which have been moved or at the fixed member 417 if all of the movable members have already been moved to the right when the sliding block 484 is moved. To cancel the holding in order to release the movable members, the sliding block 484 can be moved back so that all the keys 497A-C are pushed up. The vertical displacement of the keys via the sliding block 484 is small and the horizontal movement of the sliding block 484 can be achieved via many mechanisms, such as an electronic solenoid or a short SMA wire.

An alternative holding mechanism is illustrated in FIG. 7 with respect to movable member 412. The alternative holding mechanism includes a pawl 486 and a ratchet portion 487 of the base member 421. The pawl 486 allows the movable member 412 to be held at any position. To release the movable member 412, the pawl 486 is pulled away (either rotated upward or pulled upward) from the ratchet portion 487 by a mechanism (not shown) such as an electronic solenoid or a short SMA wire.

Automatic Activation

The active material actuator assembly 410 can automatically mechanically activate the active material components sequentially to eliminate control logic and therefore reduce the cost. To realize this, the proximal ends of the active material components 432, 438 and 444 at the anchor member 418 are all connected to the negative pole of the electric current supply, such as a battery (supply not shown) and the positive pole of the electric current supply is connected to separate electrical contact strips 491A, 491B and 491C each located on the base member 421 between movable members (see FIG. 7). The bottom of each movable member 412, 414 and 416 has its own specific electrical contact strip running fore and aft (in the same direction that the movable members 412, 414 and 416 move) that is aligned with a specific electrical contact strip on the base member 421. For example, referring to FIG. 7, movable member 412 has electrical contact strip 490A (shown with dashed lines) on a bottom surface thereof that is aligned with electrical contact strip 491A (also referred to herein as a first active material activation mechanism) on the base member 421. Movable member 414 has an electrical contact strip 490B on a bottom surface thereof that is aligned with electrical contact strip 491B (also referred to herein as a second active material activation mechanism) on the base member 421. Movable member 416 has an electrical contact strip 490C (shown with dashed lines) on a bottom surface thereof that is aligned with electrical contact strip 491C on the base member 421. The active material component connected to each distal movable member always maintains electrical contact with the electrical contact strip on the bottom of the movable member it is attached to. When a switch (not shown) is turned on to allow power flow from the electric current supply, active material component 444 will be in a closed circuit (the circuit including the electrical contact strip 490A, the electrical contact strip 491A, the active material component 444 and the power leads) causing active material component 444 to contract and move movable member 412 toward movable member 414. After movable members 412 and 414 lock together, further movement of movable member 412 will cause electrical contact strip 490A to be out of contact with electrical contact strip 491A on the base member 421 and will cause the electrical contact strip 490B at the bottom of movable member 414 to be in contact with electrical contact strip 491B on the base member 421. At this point, active material component 444 is in open circuit and active material component 438 is in closed circuit. Thus, an activation input to the second movable member, i.e., power from the electric current supply attached to the power leads, activates the active material component 438 to move the movable member 414 (and movable member 412 locked thereto). This "automatic activation" of the next active material component via movement of the previous movable member will be repeated until the movable member 416 reaches fixed member 417. By using a contact switch on movable member 417, the power can be turned off.

By locking each locking mechanism as each respective active material component 444, 438, and 432 contracts, the load operatively attached to the first movable member or the first movable member itself has a travel distance equaling the sum of the respective gaps (i.e., the open space along base member 421) between movable members 412 and 414, between movable members 414 to 416 and between movable member 416 and fixed member 417. To return the load back toward the distal end of base member 421, the holding mechanism is first released (i.e., sliding member 484 is moved) if it was utilized, and the latch 495C is released from the locking pin 497C. As the active material component 432 is cooled and applies less resistance to stretching, the force of the returning mechanism also referred to as the load (e.g., a dead weight, a constant spring, a linear spring, a strut) is able to pull all the movable members 412, 414 and 416 toward the distal end of the base member 421. When movable member 416 is closer to its designed pre-contraction position, the latching between latch 495B and locking pin 497B is released by ramped key 498B and therefore movable member 416 can be detached from movable members 412 and 414. Similarly, movable member 414 will detach from movable member 412 and stop at the designed pre-contraction location due to the ramped key 498A.

Large displacement can be achieved by the active material actuator assembly 410, as many movable members can be added. The surface area between the movable members and the base member 421 (on which the movable members slide, roll or roll and slide) can be minimized to reduce friction losses. Finally, the returning force of the load can be matched very easily by a load holding force profile as the size or number of active material components, the composition and/or the transformation temperatures can be different for different movable members. Therefore, any returning mechanism such as strut, dead weight, linear spring, constant spring etc. can be chosen for convenience and performance. To have proper fatigue life and for safety and reliability, it is important that the active material components are not over-stretched by the returning mechanism.

In the embodiment shown in FIG. 8, all of the movable members 412, 414 and 416, and the fixed member 417 have same sized components (the body of movable member or fixed member, the latches 495A-495C, the setscrew at the top of each movable member 412, 414, 416 and fixed member 417 to adjust the tension of springs 499A-499C) as shown in movable members 412, 414 and 416, as well as components of varying dimension (locking pin 497A and ramped key 498A) as shown in and discussed with respect to FIG. 9.

FIG. 9 shows movable member 412 locked to movable member 414 which is locked to movable member 416. Key 498B acts as a power off holding mechanism as it is raised by bump 485 to interfere with pin 497B. FIG. 9 illustrates the positioning just prior to automatic activation of active material component 432 (not shown in this cross-section) to move moveable member 416 to lock to fixed member 417.

Exemplary Embodiments of Other Active Material Actuator Assemblies

Figure 10:
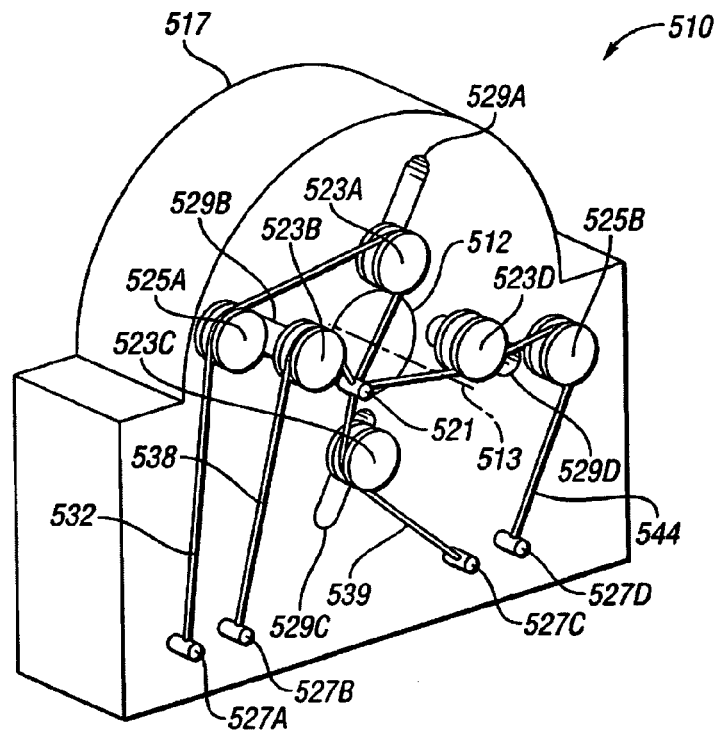
FIG. 10 is a schematic perspective illustration of another embodiment of an active material actuator assembly.
Figure 11:
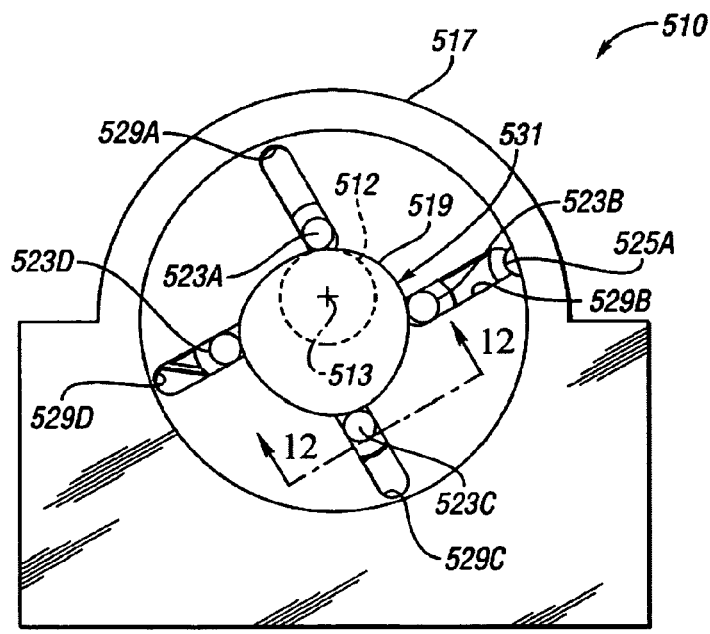
FIG. 11 is a schematic rear view illustration of the active material actuator assembly of FIG. 10.

Referring to FIG. 10, an active material actuator assembly 510 includes a movable member in the form of a shaft 512 that is rotatable about a center axis 513. The shaft 512 is concentric with an opening of a base member 517 and rotates therein. Optionally, a bearing may be placed between the shaft 512 and the base 517 to aid rotation. Referring to FIG. 11, on an opposite side of the base 517, a cam lobe 519 is connected for rotation with the shaft 512. Referring again to FIG. 10, an extension member, which may be referred to herein as a pin 521 extends from the shaft 512 such that it is offset from and parallel with the center axis 513. Multiple active material components 532, 538, 539 and 544, shown in the form of wires (but which may be belts, straps, strips, thin plates, chains or other shapes), have one end attached to the pin 521. Active material component 532 is bent over pulley 523A and further bent over pulley 525A and extended toward the bottom of the base 517 where an end is attached to retaining pin 527A. Active material component 538 is bent over pulley 523B and extends toward the bottom of the base 517 where it attaches at an end to retaining pin 527B. Active material component 539 is bent over pulley 523C and extends toward the bottom of base 517 where it attaches to retaining pin 527C. Active material component 544 is bent over pulley 523D and further bent over pulley 525B and extends toward the bottom of base 517 where it attaches to retaining pin 527D. As an alternative to the pulleys 523A-D and 525A-B, gears may be used with the active material components 532, 538, 539 and 544 (or at least a nonactive wire portion connected thereto) being in the form of chains. The pulleys 523A-523D (or gears if used instead of pulleys) are also referred to herein as sliding elements.

By bending the active material components 532, 538, 539 and 544 via pulleys 523A-D and 525A-B to extend in a common direction, packaging size is greatly reduced, with only one long dimension (the distance between the pulleys and the retaining pins at the bottom of the base member 517) accommodating the length of the active material components. Optionally, to avoid fatigue degradation due, directly or indirectly, to bending of the active material components, regular metal wires (or belts, strips, etc.) having long fatigue life may be used for any portion experiencing bending and active material composition may be used only for the portion from the respective pulleys 525A, 523B, 523C and 525B to the retaining pins 527A-D (i.e., the portion that remains straight throughout the actuation cycle).

The base member 517 has multiple slots 529A, 529B, 529C and 529D extending therethrough. Extension portions of the pulleys 523A, 523B, 523C and 523D extend through the respective slots 529A, 529B, 529C and 529D so that a portion of each pulley is in contact with a cam surface 531 of the cam lobe 519.

Resetting Cooled Active Material Components and Avoiding Stretching of Hot Active Material Components The active material components 532, 538, 539 and 544 can be actuated in that order in a repeating series (or in the reverse order in a repeating series) to move the pin 521 and therefore rotate the shaft 512 to which a load is attached (or which constitutes a load). Both clockwise and counterclockwise rotation can be equally achieved in the actuator 510 by reversing the order of actuation. To avoid overstretching, to decrease resistance to stretching of a just actuated and still hot active material component and to decrease response time, the pulleys 523A-523D are designed to move in the respective slots 529A-529D according to the cam surface 531 (i.e., the cam profile) of the cam lobe 519, shown in FIG. 11. In FIG. 11, pulleys 523C and 523D are shown on a larger arc of the cam surface 531 and in the farthest position relative to the center axis 513. In contrast, pulleys 523A and 523B are on a smaller arc and in the nearest position relative to the center axis 513. The pin 521 is nearest to pulley 523C (see FIG. 10), active material component 539 (referred to in the claims as the first active material component) has just been actuated and it is time to activate active material component 544 (referred to in the claims as the second active material component). During the contraction of active material component 544, pulley 523D will sit on the larger arc and remain a constant distance to the center axis 513. The pin 521 will be pulled and moved toward pulley 523D. Pulley 523C will move toward the center axis 513 because it will be on the smaller arc when pin 521 moves near pulley 523D. Due to this inward motion of pulley 523C sliding in slot 529C toward the center axis 513, the previously actuated and potentially not yet cooled active material component 539 will not be further stretched and will apply no resistance to the work done (i.e., to the rotation of shaft 512) by actuation of active material component 544 provided the portion of active material component 544 (or wire if that portion is not active material) between pulley 523C and retaining pin 527C is barely stretched. This portion of active material component 544 between pulley 523C and retaining pin 527C will change in length only a minimal amount if it is nearly perpendicular to the longitudinal direction of the slot and if it is much longer than the longitudinal dimension of the slot. FIG. 10 is schematic in nature and the dimensions are not to scale. Positions and shapes of the slots and positions of the retaining pins are also schematic. In addition, additional pulleys (not shown for simplicity) may slide with pulleys 523A-D and help with the routing of the active material components. Although pulley 523B sits on the same smaller arc during this period, the cooled active material component 538 is stretched since pin 521 moves near to pulley 523D from a position near pulley 523C. Pulley 523A increases its distance from the shaft center during this period since the rotating cam 519 causes it to slide in slot 529A and move to a larger arc, maintaining the length of the active material component 532 between pin 521 and pulley 523A. When activation of active material component 544 is complete, active material component 532 is in the right position and ready for a subsequent activation.

Within the scope of the invention, the number of active material components is not limited to four. A rotational motor as in FIGS. 10 and 11 could haven only three or more than four active material components. Furthermore, the slots 529A-D are not limited to the shape shown. A center line running the length of each slot does not necessarily pass through the shaft center and need not be straight.

Automatic Activation

Figure 12:
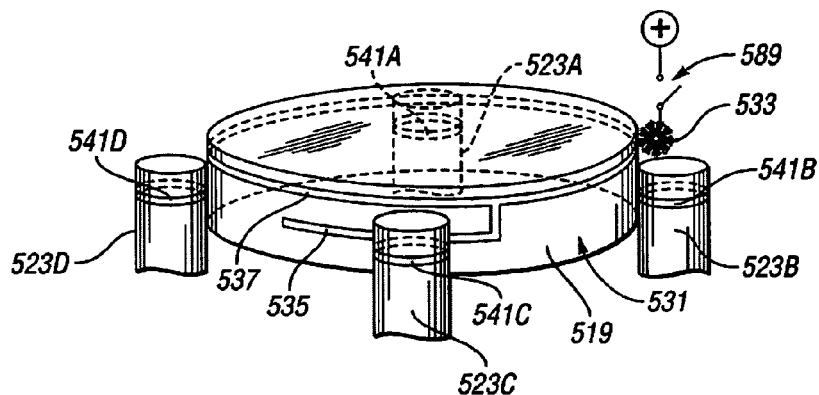
FIG. 12 is a schematic illustration in fragmentary, partially rotated view of the cam lobe and pulleys of FIGS. 10 and 11 taken along the arrows shown in FIG. 11.

Sequential automatic activation by the mechanical rotation of the shaft 512 can be utilized to allow the elimination of control logic to activate the active material components 532, 538, 539 and 544 sequentially and therefore potentially reduce cost. The four individual ends of the active material components connected to pins 527A through 527D can be connected to the negative pole of a battery (not shown). Referring to FIG. 12, the positive pole of the battery is connected to a switch 589 and then connected to an electrical brush 533 on the cam surface 531 of cam 519. An electrical contact strip 535 extends partially around the cam surface 531. The contact strip 535 is in electrical contact with a circular electrical strip 537 on the cam surface 531 that touches the brush 533 at all times. On the surface of each pulley 523A, 523B, 523C and 523D that touches the cam surface 531, there is a circular electrical contact strip 541A, 541B, 541C and 541D, respectively, positioned to be sequentially in contact with the contact strip 535 as the shaft rotates. The circular electrical contact strip 541A-541D on each pulley 523A-523D is electrically connected to the surface area of the pulley that the respective active material component is touching (or that a non-active material portion, e.g., a metal portion of a wire, strip, chain or belt that is connected to an active material portion, as explained above, is touching). All surface areas of the cam surface 531 and of the pulleys 523A-523D are non-conducting except those mentioned above.

When the switch 589 is closed (i.e., by turning on the actuator assembly 510), electrical power runs to the full circle electrical contact strip 537 and to whichever one of the pulleys 523A-523B is then positioned in contact with the contact strip 535 (pulley 523C in FIG. 12). The active material component connected with that pulley is activated to move the pin 521. Movement of the pin 521 due to actuation of that active material component, as described above, will rotate the cam 519, causing the next sequential one of the pulleys to be positioned in contact with the electrical contact strip 535 to activate the active material component connected thereto (and will cause the previously actuated active material component to move out of contact with the contact strip 535). The contact strip 535 may extend 90 degrees or so around the cam surface such that only one of the four pulleys 523A-532D is in contact with the contact strip 535 at any given time. Alternatively, the contact strip may extend less than 90 degrees, to allow a longer cooling period between activations, or greater than 90 degrees such that there is some overlap of activation of the active material components. The portion of the cam profile 519 about which the contact strip 535 extends may be longer if only three active material components and corresponding pulleys are used, or shorter if more than four are used. In general, the portion over which the contact strip 535 extends is cam-profile dependent.

Power off holding of the active material actuator assembly 510 is desirable. It can be realized via the locking mechanism (and corresponding release mechanism) similar to that described with respect to the active material actuator assemblies 410 above or a ratchet mechanism.

Figure 13:
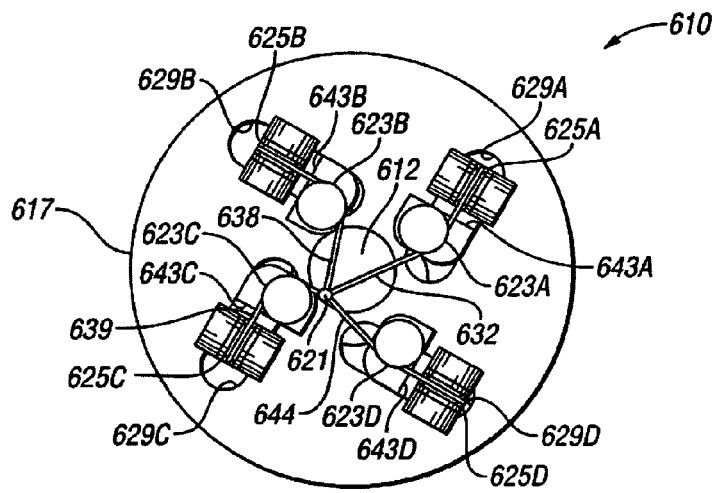
FIG. 13 is a schematic end view illustration of another embodiment of an active material actuator assembly.
Figure 14:
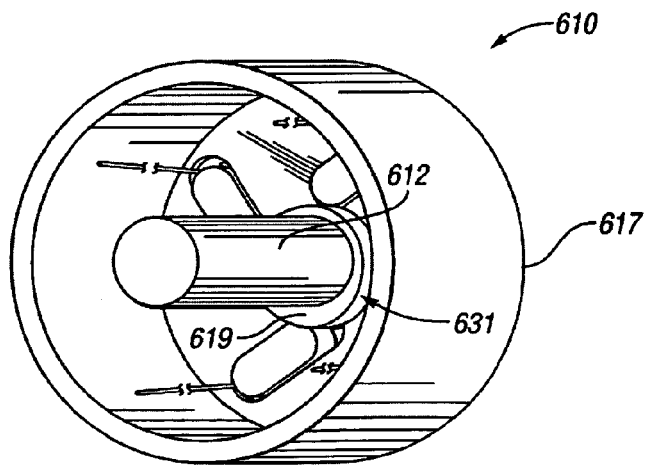
FIG. 14 is a schematic perspective illustration of the active material actuator assembly of FIG. 13 showing an opposing end.

Another embodiment of an active material actuator assembly 610 operating as an incremental rotational motor is shown in FIG. 13. A shaft 612 with an extension or pin 621 is concentric with a hole through a cylindrical housing 617 and rotates with or without the help of a bearing. Active material components 632, 638, 639 and 644 are attached to the biased pin 621 at one end, bent over pulleys 623A-D and 625A-D and attached to retaining pins at the other end of the cylindrical housing (pins not shown, but FIG. 14 shows the active material components in fragmentary view extending toward the pins). The pulleys 623A-D and 625A-D sit on sliders 643A-D that slide in slots 629A-D of the cylindrical housing 617. The active material components 632, 638, 639 and 644 can be activated sequentially and therefore rotate the shaft 612 with respect to the cylindrical housing 617. Since all the active material components 632, 638, 639 and 644 are bent (via the pulleys 625A-D) to extend in the axial direction of the shaft 612, sufficiently-sized active material components able to achieve large displacement (e.g., active material components of a sufficient length to achieve adequate displacement of the movable member via contraction of each active material component) are enabled while packaging size is minimized. Optionally, to avoid fatigue degradation due to bending of active material components, non-active material portions (e.g., regular metal wire) having long fatigue life can be substituted for any portion of the active material components experiencing bending and active material can be used only in the portion that remains straight throughout the actuation cycle, i.e., the portion nearly parallel to the axial direction of the shaft 612.

The sliders 643A-643D ride on a cam lobe 619 of the shaft 612. The cam profile 631 (shown in the FIG. 14) allows the slider to which the just-actuated active material component is operatively connected to move toward the center of the shaft 612 and therefore prevents being pulled by the next-actuated active material component. The cam profile 631 therefore utilizes the contraction force of the active material components more efficiently (i.e., utilizes the force to turn the shaft rather than to work against restrictive force of the just-actuated active material component), allows more cooling time before stretching of a previously actuated component, and decreases the cycle time of the actuator assembly 610. The cam profile 631 can also be made to avoid unnecessary overstretching of the active material components. In FIGS. 13 and 14, each active material component is only stretched by the opposite actuated active material component (i.e., active material component 644 is stretched when active material component 638 is actuated and vice versa, and active material component 639 is stretched when active material component 632 is activated and vice versa) and the amount of stretch is the same as the amount needed to pull the pin 621 and rotate the shaft 612 when it is actuated.

Automatic activation is possible which will eliminate the use of control logic to activate wires sequentially and therefore reduces the cost. By providing an electrical contact strip only partially extending around the cam surface similarly to electrical contact strip 535 in the embodiment of FIG. 12, the respective active material components will be activated sequentially as the shaft 612 rotates. Power off holding is desirable and it can be realized via a ratcheting or locking and releasing mechanisms, as described with respect to other embodiments herein.

Note that in the active material actuator assembly 610, the number of active material components is not limited to four. There could be only three active material components or more than four. The slots 629A-D are not limited to the configuration shown. The center line of the slots does not necessarily pass through the shaft center and is not necessarily straight. In addition, both clockwise and counterclockwise rotation can be equally achieved in the said mechanism. Moreover, to reduce response time and decrease cooling time while maintaining required force, several thinner SMA components can be used in place of each active material component (e.g., several thinner SMA wires in place of each single SMA wire) to connect the distal end.

While the best modes for carrying out the invention have been described in detail, those familiar with the art to which this invention relates will recognize various alternative designs and embodiments for practicing the invention within the scope of the appended claims.

The invention claimed is:

1. An active material actuator assembly comprising:
   a movable member:
   multiple active material components operatively connected to said movable member, each selectively activatable for moving said movable member;
   at least one activation mechanism in communication with an activating input and partially defining a circuit; and
   wherein a first of the active material components is actuated to move the movable member so that the movable member physically closes the circuit and operatively connects the at least one activation mechanism and the activating input to the second of the active material components causing the second of the active material components to actuate to further move said movable member; actuation of the second of the active material components thereby occurring without control logic.

2. The active material actuator assembly of claim 1, wherein said movable member is a shaft rotatable about a center axis, and further comprising:
   a cam lobe having a cam surface operatively connected for rotation with said shaft;
   an extension member extending from said shaft offset from and substantially parallel with said center axis; wherein each of said active material components is operatively connected to said extension member;
   multiple sliding elements each having one of said active material components operatively connected thereto;
   a base member having multiple slots therein; and wherein a portion of each of said sliding elements is slidable within a respective one of said slots toward or away from said center axis due to contact with said cam surface as said cam lobe rotates.

3. The active material actuator assembly of claim 2, wherein said active material components extend in a substantially common direction for attachment to said base member to increase compactness of said active material actuator assembly.

4. The active material actuator assembly of claim 2, wherein one of said sliding elements is operatively connected with said second active material component; and wherein said one of said sliding elements slides toward said center axis in one of said slots as said second active material component is actuated to thereby minimize resetting of said first active material component during actuation of said second active material component.

5. The active material actuator assembly of claim 2, wherein said at least one activation mechanism includes electrical contact members each on a respective circumferential surface of a different one of said sliding elements; and wherein said cam surface has an electrical contact member extending partially therearound and axially positioned to be in contact with said electrical contact strips on said sliding elements as said cam lobe rotates such that said active material components are activatable in sequential order in a given rotational direction.

6. The active material assembly of claim 1, wherein said movable member is a first movable member, and further comprising:
   a second movable member;
   a fixed member;
   an anchor member;
   a base member; wherein said first movable member, said second movable member, said fixed member and said anchor member are aligned on said base member in respective order; wherein said first active material component connects said first movable member to said anchor member; wherein said second active material component connects said second active material member to said anchor member; wherein said at least one activation mechanism includes first and second electrical contact members offset from one another on said base member; wherein each of said movable members has another respective electrical contact member thereon positioned to be electrically communicable with a respective one of said electrical contact members on said base member; and wherein movement of said first movable member via powering of said first electrical contact member moves said contact member of said second movable member into contact with said second electrical contact member, thereby activating said second active material component.

7. The active material assembly of claim 1, wherein said movable member is a first movable member, and further comprising:
   a second movable member;
   an anchor member;
   wherein said first active material component is connected to said anchor member and to said second movable member;
   wherein said second active material component is connected to said second movable member and said first movable member; and
   wherein said first movable member is engaged with said second movable member such that said first movable member moves with said second movable member due to actuation of said first active material component.

8. An active material actuator assembly comprising:
   a shaft rotatable about a center axis;
   multiple active material components operatively connected to said shaft and selectively activatable in a repeating series for sequential actuation for moving said shaft;
   wherein said active material components are configured such that a previously activated one of said active material components is not substantially stretched by actuation of a currently activated active material component;
   a cam lobe having a cam surface connected for rotation with said shaft:
   an extension member extending from said shaft offset from and substantially parallel with said center axis; wherein each of said active material components is operatively connected to said extension member and is selectively activatable to actuate and thereby rotate said shaft;
   multiple sliding elements each having one of said active material components operatively connected thereto;
   a base member having multiple slots therein; and wherein a portion of each of said sliding elements is slidable within a respective one of said slots toward and away from said center axis due to contact with said cam surface as said cam lobe rotates.

9. An active material actuator assembly comprising:
   a movable member;
   multiple active material components operatively connected to said movable member and selectively activatable in a repeating series for sequential actuation for moving said movable member; and
   wherein said active material components are configured such that a subsequently activated one of said active material components is moved by the movable member when the movable member moves due to actuation of a currently activated one of said active material components so that the subsequently activated one of said active material components is at least partially reset.

10. The active material actuator assembly of claim 9, wherein said movable member is a shaft rotatable about a center axis, and further comprising:
   a cam lobe having a cam surface connected for rotation with said shaft:
   an extension member extending from said shaft offset from and substantially parallel with said center axis; wherein each of said active material components is operatively connected to said extension member and is selectively activatable to actuate and thereby rotate said shaft;
   multiple sliding elements each having one of said active material components operatively connected thereto;
   a base member having multiple slots therein; and wherein a portion of each of said sliding elements is slidable within a respective one of said slots toward and away from said center axis due to contact with said cam surface as said cam lobe rotates.

11. The active material actuator assembly of claim 1, wherein the at least one activation mechanism is at least one electrical contact strip.

* * * * *